(12) United States Patent
Young

(10) Patent No.: US 11,227,216 B2
(45) Date of Patent: *Jan. 18, 2022

(54) BATCH PROCESSING IN A NEURAL NETWORK PROCESSOR

(71) Applicant: Google LLC, Mountain View, CA (US)

(72) Inventor: Reginald Clifford Young, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/226,256

(22) Filed: Apr. 9, 2021

(65) Prior Publication Data

US 2021/0224654 A1 Jul. 22, 2021

Related U.S. Application Data

(63) Continuation of application No. 16/139,258, filed on Sep. 24, 2018, which is a continuation of application
(Continued)

(51) Int. Cl.
*G06N 3/08* (2006.01)
*G06N 3/063* (2006.01)
(Continued)

(52) U.S. Cl.
CPC ............... *G06N 3/08* (2013.01); *G06N 3/063* (2013.01); *G06N 5/04* (2013.01); *G06N 3/06* (2013.01)

(58) Field of Classification Search
None
See application file for complete search history.

(56) References Cited

U.S. PATENT DOCUMENTS 5,014,235 A 5/1991 Morton
5,136,717 A 8/1992 Morley et al.
(Continued)

FOREIGN PATENT DOCUMENTS

CN 1150847 A 5/1997
CN 104035751 A 9/2014
(Continued)

OTHER PUBLICATIONS

Beamer et al., "Ivy Bridge Server Graph Processing Bottlenecks," The First International Workshop Computer Architecture for Machine Learning, Jun. 2015, 56pages.
(Continued)

*Primary Examiner* — Vincent Gonzales
(74) *Attorney, Agent, or Firm* — Lerner, David, Littenberg, Krumholz & Mentlik, LLP

(57) ABSTRACT

Methods, systems, and apparatus, including computer programs encoded on computer storage media, for generating a respective neural network output for each of a plurality of inputs, the method comprising, for each of the neural network layers: receiving a plurality of inputs to be processed at the neural network layer; forming one or more batches of inputs from the plurality of inputs, each batch having a number of inputs up to the respective batch size for the neural network layer; selecting a number of the one or more batches of inputs to process, where a count of the inputs in the number of the one or more batches is greater than or equal to the respective associated batch size of a subsequent layer in the sequence; and processing the number of the one or more batches of inputs to generate the respective neural network layer output.

20 Claims, 6 Drawing Sheets

Related U.S. Application Data

No. 14/844,431, filed on Sep. 3, 2015, now Pat. No. 10,083,395.

(60) Provisional application No. 62/165,020, filed on May 21, 2015.

(51) Int. Cl.
  *G06N 5/04* (2006.01)
  *G06N 3/06* (2006.01)

(56) References Cited

U.S. PATENT DOCUMENTS

| | | |
|---|---|---|
| 5,138,695 A | 8/1992 | Means |
| 5,146,543 A | 9/1992 | Vassiliadis et al. |
| 5,337,395 A | 8/1994 | Vassiliadis et al. |
| 5,471,627 A | 11/1995 | Means et al. |
| 5,544,336 A | 8/1996 | Kato |
| 5,574,827 A | 11/1996 | Wang |
| 5,586,223 A | 12/1996 | Bryant et al. |
| 5,799,134 A | 8/1998 | Chiueh et al. |
| 5,812,993 A | 9/1998 | Ginosar et al. |
| 6,038,337 A | 3/2000 | Lawrence |
| 6,184,753 B1 | 2/2001 | Ishimi et al. |
| 6,917,703 B1 | 7/2005 | Steffens et al. |
| 7,136,710 B1 | 11/2006 | Hoffberg |
| 8,184,696 B1 | 5/2012 | Chirila-Rus |
| 8,468,109 B2 | 6/2013 | Moussa et al. |
| 8,924,455 B1 | 12/2014 | Barman et al. |
| 2002/0143720 A1 | 10/2002 | Anderson et al. |
| 2005/0044053 A1 | 2/2005 | Moreno |
| 2007/0022063 A1 | 1/2007 | Lightowler |
| 2007/0086655 A1 | 4/2007 | Simard et al. |
| 2008/0319933 A1 | 12/2008 | Moussa |
| 2011/0029471 A1 | 2/2011 | Chakradhar et al. |
| 2014/0142929 A1 | 5/2014 | Seide et al. |
| 2014/0164299 A1 | 6/2014 | Sainath et al. |
| 2014/0180989 A1 | 6/2014 | Krizhevsky et al. |
| 2014/0288928 A1 | 9/2014 | Penn et al. |
| 2014/0337262 A1 | 11/2014 | Kato et al. |
| 2015/0066499 A1 | 3/2015 | Wang et al. |
| 2015/0127337 A1 | 5/2015 | Heigold et al. |
| 2016/0267111 A1 | 9/2016 | Shoaib |

FOREIGN PATENT DOCUMENTS

| | | |
|---|---|---|
| EP | 0422348 A2 | 4/1991 |
| EP | 3064130 A1 | 9/2016 |
| JP | 2013105377 A | 5/2013 |
| KR | 19970049687 A | 7/1997 |
| KR | 20100100105 A | 9/2010 |
| KR | 20150016089 A | 2/2015 |
| SG | 182933 A1 | 8/2012 |
| TW | 201232429 A | 8/2012 |
| TW | 201331855 A | 8/2013 |
| WO | 2015003436 A1 | 1/2015 |

OTHER PUBLICATIONS

Bo et al., "String Kernel Testing Acceleration Using Micron's Automata Processor," The First International Workshop Computer Architecture for Machine Learning, Jun. 2015, 21 pages.
Chen and Li, "Hardware Acceleration for Neuromorphic Computing—An Evolving View," The First International Workshop Computer Architecture for Machine Learning, Jun. 2015, 38 pages.
Chillet et al., "A Neural Network Model for Real-Time Scheduling on Heterogeneous SoC Architectures," Proceedings of International Joint Conference on Neural Networks, Aug. 2007, pp. 102-107.
Farabet et al., "Hardware Accelerated Convolutional Neural Networks for Synthetic Vision Systems," Circuits and Systems (ISCAS), Proceedings of 2010 IEEE International Symposium on, May-Jun. 2010, pp. 257-260.
Ginosar, "Accelerators for Machine Learning of Big Data," The First International Workshop Computer Architecture for Machine Learning, Jun. 2015, 13 pages.
Gokhale, "Enabling Machines to Understand our World," The First International Workshop Computer Architecture for Machine Learning, Jun. 2015, 18 pages.
Indiveri, "Neuromorphic circuits for building autonomous cognitive systems," The First International Workshop Computer Architecture for Machine Learning, Jun. 2015, 37 pages.
Kane, "An instruction systolic array architecture for multiple neural network types," Loughborough University, Doctoral Thesis, Sep. 1998, 315 pages.
Khan and Ling, "Systolic architectures for artificial neural nets," Neural Networks, 1991. 1991 IEEE International Joint Conference on, vol. 1, Nov. 1991, pp. 620-627.
Lee and Song, "Implementation of the Super-Systolic Array for Convolution," Design Automation Conference, 2003. Proceedings of the ASP-DAC 2003. Asia and South Pacific, Jan. 2003, pp. 491-494.
Lehmann et al., "A generic systolic array building block for neural networks with on-chip learning," Neural Networks, IEEE Transactions on, 4(3):400-407, May 1993.
Lipasti et al., Mimicking the Self-Organizing Properties of the Visual Cortex, The First International Workshop Computer Architecture for Machine Learning, Jun. 2015, 23 pages.
Mahapatra et al., "Mapping of Neural Network Models onto Systolic Arrays," Journal of Parallel and Distributed Computing 60, 677-689, Jan. 2000.
Ovtcharov et al., "Accelerating Deep Convolutional Neural Networks Using Specialized Hardware in the Datacenter," The First International Workshop Computer Architecture for Machine Learning, Jun. 2015, 33 pages.
Pearce, "You Have No (Predictive) Power Here, SPEC!" The First International Workshop Computer Architecture for Machine Learning, Jun. 2015, 15 pages.
Rojas, "Hardware for Neural Networks," Neural Networks, Springer-Verlag, Berlin, 1996, pp. 451-478.
Shaaban, "Systolic Architectures," PowerPoint Presentation, Mar. 2003, 9 pages.
Shapri and Rahman, "Performance Analysis of Two-Dimensional Systolic Array Matrix Multiplication with Orthogonal Interconnections," International Journal on New Computer Architectures and Their Applications (IJNCAA) 1 (3):1066-1075, Dec. 2011.
Smith, "Biologically Plausible Spiking Neural Networks," The First International Workshop Computer Architecture for Machine Learning, Jun. 2015, 77 pages.
Sudha et al., "Systolic array realization of a neural network-based face recognition system," Industrial Electronics and Applications, 2008, ICIEA 2008, 3rd IEEE Conference on, pp. 1864-1869, Jun. 2009.
Wong et al., "A New Scalable Systolic Array Processor Architecture for Discrete Convolution," College of Engineering at the University of Kentucky, Master Thesis, 2003, 175 pages.
AHM SHapri and N.A.Z Rahman. "Performance Analysis of Two-Dimensional Systolic Array Matrix Multiplication with Orthogonal Interconnections," Internationa lJournal on New Computer Architectures and Their Applications, 1(3), 2001, pp. 1090-1000.
Dielman, Sander, Kyle W. Willett, and Joni Dambre. "Rotation-invariant convolutional neural networks for galaxy morphology prediction," Monthly notices of the royal astronomical society, 450.2, 2015, pp. 1441-1459.
Kim et al. "Efficient Hardware Architecture for Sparse Coding," IEEE Transactions on Signal Processing 62.16, Aug. 15, 2014, 14 pages.
Lee, Yim-Kul, and William T. Rhodes. "Nonlinear image processing by a rotating kernel transformation," Optics letters 15.23, 1990, pp. 1383-1385.
Lo, Shih-Chung B., et al. "Artificial convolutional neural network for medical image pattern recognition," Neural networks 8.7, 1995, pp. 1201-1214.
Merolla et al. "A digital Neurosynaptic Core Using Embedded Crossbar Memory with 45pJ per Spike in 45nm," IEEE CICC, Sep. 19, 2011, 4 pages.

(56) References Cited

OTHER PUBLICATIONS

Yiping et al. "A High Performance Digital Neural Processor Design by Network on Chip Architecture" IEEE VLSI Design, Automation and Test, Apr. 25, 2011, 4 pages.
International Search Report and Written Opinion in International Application No. PCT/US2016/029968, dated Sep. 1, 2016, 14 pages.
International Search Report and Written Opinion in International Application No. PCT/US2016/029294, dated Sep. 1, 2016, 13 pages.
International Search Report and Written Opinion in International Application No. PCT/US2016/029986, dated Sep. 1, 2016, 13 pages.
International Search Report and Written Opinion in International Application No. PCT/US2016/029965, dated Sep. 1, 2016, 13 pages.
Krizhevsky et al., "ImageNet classification with deep convolutional neural networks," The 26th annual conference on Neural Information Processing Systems (NIPS'25), Dec. 2012, pp. 1-9, XP55113686.
Kung, "VLSI Array Processors," IEEE ASSP Magazine, IEEE, vol. 2, No. 3, Jul. 1, 1985, pp. 4-22, XP011370547.
Carlo et al., "An Area-Efficient 2-D Convolution Implementation on FPGA for Space Applications," IEEE Computer Society, Dec. 11, 2011, pp. 1-7.
Office Action in Taiwanese Application No. 105115859, dated Nov. 16, 2016, 10 pages.
Cornu et al., "Design, Implementation, and Test of a Multi-Model Systolic Neural-Network Accelerator," Scientific Programming—Parallel Computing Projects of the Swiss Priority Programme, vol. 5, No. 1, Jan. 1, 1996, pp. 47-61, XP055294242.
Dawwd, "The multi 2D systolic design and implementation of Convolutional Neural Networks," 2013 IEEE 20th International Conference on Electronics, Circuits, and Systems (ICECS), IEEE, Dec. 8, 2013, pp. 221-224, XP032595248.
Graf et al., "A Massively Parallel Digital Learning Processor," Proceedings of the 22nd annual conference on Neural Information Processing Systems (NIPS), Dec. 2008, 8 pages, XP055016863.
Hecht et at., "An advanced programmable 2D-convolution chip for, real time image processing," Signal Image and Video Processing, Jun. 1991; [Proceedings of the International Symposium on Circuits and Systems], vol. SYMP. 24, Jun. 11, 1991, pp. 1897-1900, XP010046404.
International Search Report and Written Opinion in International Application No. PCT/US2016/030515, dated Aug. 25, 2016, 19 pages.
International Search Report and Written Opinion in International Application No. PCT/US2016/030536, dated Aug. 31, 2016, 17 pages.
Kim et al., "A Large-Scale Architecture for Restricted Boltzmann Machines," Field-Programmable Custom Computing Machines (FCCM), 2010 18th IEEE Annual International Symposium on, IEEE, May 2, 2010, pp. 201-208, XP031681940.
Kung et al., "Two-level pipelined systolic array for multidimensional convolution," Image and Vision Computing, Elsevier, vol. 1, No. 1, Feb. 2, 1983, pp. 30-36, XP024237511.
Patil et al., "Hardware Architecture for Large Parallel Array of Random Feature Extractors applied to Image Recognition," Dec. 24, 2015, arXiv:1512 07783v1, 18 pages, XP055296121.
Wu et al., "Flip-Rotate-Pooling Convolution and Split Dropout on Convolution Neural Networks for Image Classification," Jul. 31, 2015, arXiv:1507 08754v1, pp. 1-9, XP055296122.
International Preliminary Report on Patentability issued in International Application No. PCT/US2016/030515, dated Nov. 30, 2017, 12 pages.
IN Office Action in Indian Application No. 201747034501, dated Jun. 3, 2020, 5 pages (with English translation).
JP Office Action in Japanese Application No. 2019-234606, dated Jun. 23, 2020, 4 pages (with English translation).
Ovtcharov et al., "Accelerating Deep Convolutional Neural Networks Using Specialized Hardware," Microsoft Research, [online] [retrieved Mar. 25, 2021]. Retrieved from the Internet: <URL:http://www.microsoft.com/en-US/research/wp-content/uploads/2016/02/CNN20Whitepaper.pdf>, Feb. 22, 2015, 4 pages.
IN Office Action in Indian Application No. 201747034501, dated May 3, 2020, 5 pages (with English translation).
CN Office Action in Chinese Application No. 201680020154, dated Mar. 24, 2020, 10 pages (with English translation).
EP Office Action in European Application No. 16722484.9, dated Feb. 17, 2020, 6 pages.
KR Notice of Allowance in Korean Application No. 10-2017-7027872, dated Jan. 23, 2020, 3 pages (with English translation).
JP Office Action in Japan Application No. 2017550720, dated Jun. 11, 2019, 5 pages.
Office Action for European Patent Application No. 16722484.9 dated Nov. 4, 2021. 5 pages.
Notice of Allowance for Korean Patent Application No. 10-2020-7011889 dated Nov. 8, 2021. 4 pages.

BATCH PROCESSING IN A NEURAL NETWORK PROCESSOR

CROSS REFERENCE TO RELATED APPLICATIONS

This application is a continuation of U.S. application Ser. No. 16/139,258, filed Sep. 24, 2018, which is a continuation of U.S. application Ser. No. 14/844,431, filed Sep. 3, 2015, now U.S. Pat. No. 10,083,395, which is a non-provisional of and claims priority to U.S. Provisional Patent Application No. 62/165,020, filed on May 21, 2015, the entire contents of each are incorporated by reference herein.

BACKGROUND

This specification relates to computing neural network inferences in hardware.

Neural networks are machine learning models that employ one or more layers of neurons to generate an output, e.g., a classification, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters.

Traditionally, some neural network systems compute inferences serially. That is, when computing inferences for multiple inputs, the neural network system can process each input through each of the layers of the neural network to generate the output for the input before processing the next input.

SUMMARY

In general, this specification describes a special-purpose hardware circuit that computes neural network inferences.

In general, one innovative aspect of the subject matter described in this specification can be embodied in methods that include the actions of generating a respective neural network output for each of a plurality of inputs, wherein the generating comprises processing each input through each of a plurality of neural network layers to generate the respective neural network output for the input, wherein the neural network layers are arranged in a sequence, and wherein each neural network layer has a respective batch size, the method comprising, for each of the neural network layers: receiving a plurality of inputs to be processed at the neural network layer; forming one or more batches of inputs from the plurality of inputs, each batch having a number of inputs up to the respective batch size for the neural network layer; selecting a number of the one or more batches of inputs to process, where a count of the inputs in the number of the one or more batches is greater than or equal to the respective associated batch size of a subsequent layer in the sequence; and processing the number of the one or more batches of inputs to generate the respective neural network layer output.

Implementations can include one or more of the following features. The respective batch size is based at least on a weight reuse value, the weight reuse value representing a number of times that weight inputs need to be reused for a compute time of output values using the weight inputs at a matrix computation unit to be longer than a load time of the weight inputs from memory. Where the weight reuse value is based at least on a clock rate of the memory storing the weight inputs. Each batch size is based at least on the weight reuse value divided by a number of times that weight inputs for the respective layer are reused. The plurality of neural network layers is processed at a matrix processing unit, where processing the number of the one or more batches of inputs comprises computing accumulated values for each input using the matrix computation unit. The weight reuse value is based on a number of arithmetic units inside the matrix computation unit. Each input corresponds to a distinct image resource. Forming a batch from the one or more layer outputs for processing at the subsequent layer. Generating, for each output, a corresponding inference.

Particular embodiments of the subject matter described in this specification can be implemented so as to realize one or more of the following advantages. The special purpose hardware circuit can efficiently perform the computation for a neural network having multiple layers by reusing weight inputs for a given layer on multiple independent inputs. In particular, the weight inputs are reused a number of times such that a compute time of reusing the weight inputs multiple times is greater than a fetch time of accessing new weight inputs from memory, thereby maximizing throughput in the circuit and avoiding stalling of the circuit. The circuit can efficiently perform the computation even if weight inputs are reused a different number of times at each layer.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A neural network having multiple layers can be used to compute inferences. For example, given an input, the neural network can compute an inference for the input. The neural network computes this inference by processing the input through each of the layers of the neural network. In particular, the layers of the neural network can be arranged in a sequence, each with a respective set of weights. Each layer receives an input and processes the input in accordance with the set of weights for the layer to generate an output. The output can be used as an input at the next neural network layer.

Therefore, in order to compute an inference from a received input, the neural network receives the input and processes it through each of the neural network layers in the sequence to generate the inference, with the output from one neural network layer being provided as input to the next neural network layer. Data inputs to a neural network layer, e.g., either the input to the neural network or the outputs of the layer below the layer in the sequence, to a neural network layer can be referred to as activation inputs to the layer.

In some implementations, the layers of the neural network are arranged in a directed graph structure. That is, any particular layer can receive multiple inputs, multiple outputs, or both. The layers of the neural network can also be arranged such that an output of a layer can be sent back as an input to a previous layer.

Figure 1:
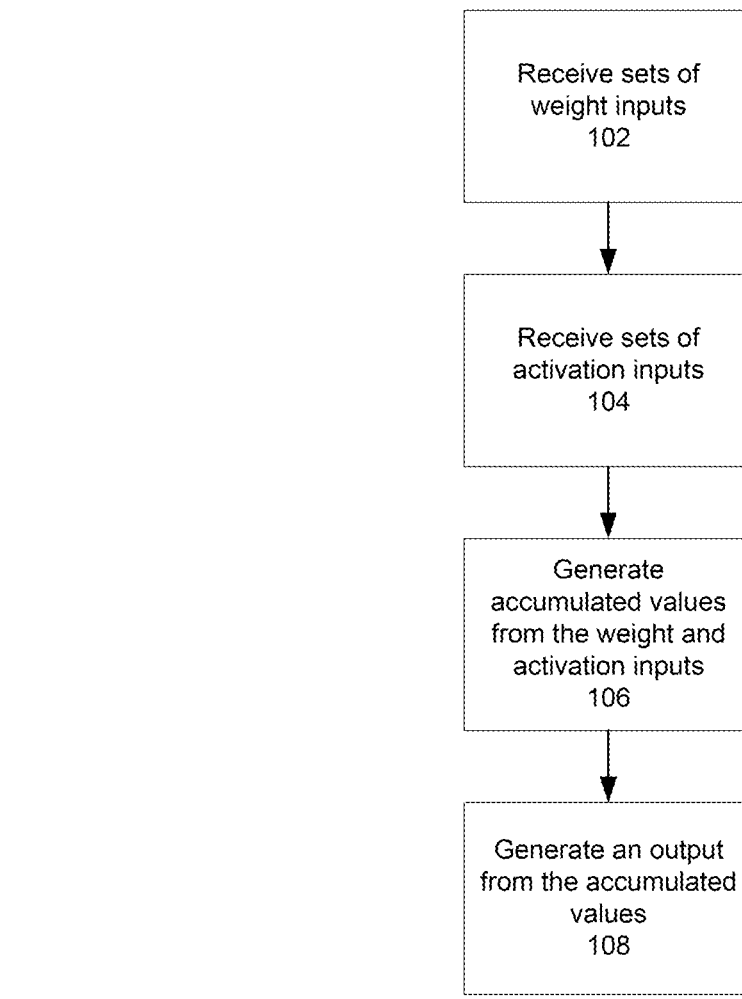
FIG. 1 is a flow diagram of an example method for performing a computation for a given layer of a neural network.

FIG. 1 is a flow diagram of an example process 100 for performing a computation for a given layer of a neural network using a special-purpose hardware circuit. For convenience, the method 100 will be described with respect to a system having one or more circuits that performs the method 100. The method 100 can be performed for each layer of the neural network in order to compute an inference from a received input.

The system receives sets of weight inputs (step 102) and sets of activation inputs (step 104) for the given layer. The sets of weight inputs and the sets of activation inputs can be received from dynamic memory and a unified buffer, respectively, of the special-purpose hardware circuit. In some implementations, both the sets of weight inputs and the sets of activation inputs can be received from the unified buffer.

The system generates accumulated values from the weight inputs and the activation inputs using a matrix multiplication unit of the special-purpose hardware circuit (step 106). In some implementations, the accumulated values are dot products of the sets of weight inputs and the sets of activation inputs. That is, for one set of weights, the system can multiply each weight input with each activation input and sum the products together to form an accumulated value. The system can then compute dot products of other set of weights with other sets of activation inputs.

The system can generate a layer output from the accumulation values (step 108) using a vector computation unit of the special-purpose hardware circuit. In some implementations, the vector computation unit applies an activation function to the accumulated values. The output of the layer can be stored in the unified buffer for use as an input to a subsequent layer in the neural network or can be used to determine the inference. The system finishes processing the neural network when a received input has been processed through each layer of the neural network to generate the inference for the received input.

Figure 2:
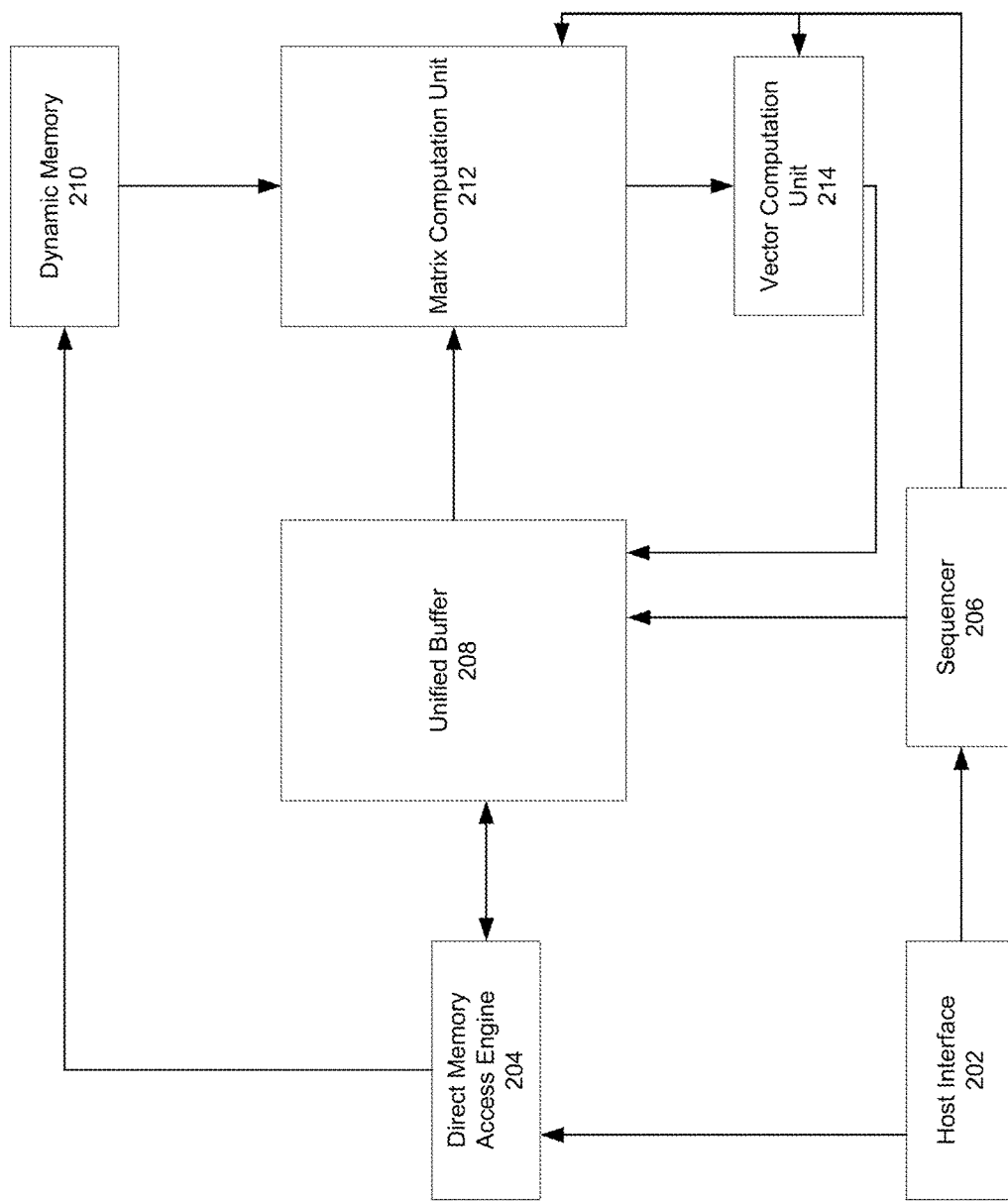
FIG. 2 shows an example neural network processing system.

FIG. 2 shows an example special-purpose integrated circuit 200 for performing neural network computations. The system 200 includes a host interface 202. The host interface 202 can receive instructions that include configuration information for a neural network computation. The configuration information can include at least one or more of the following: how many layers should be processed, corresponding sets of weight inputs for each layer of the layer, an initial set of activation inputs, i.e., the input to the neural network from which the inference is to be computed, corresponding input and output sizes of each layer, a stride value for the neural network computation, and a type of layer to be processed, e.g., a convolutional layer or a fully connected layer.

The host interface 202 can send the instructions to a sequencer 206, which converts the instructions into low level control signals that control the circuit to perform the neural network computations. In some implementations, the control signals regulate dataflow in the circuit, e.g., how the sets of weight inputs and the sets of activation inputs flow through the circuit. The sequencer 206 can send the control signals to a unified buffer 208, a matrix computation unit 212, and a vector computation unit 214. In some implementations, the sequencer 206 also sends control signals to a direct memory access engine 204 and dynamic memory 210. In some implementations, the sequencer 206 is a processor that generates clock signals. The sequencer 206 can use timing of the clock signals to, at appropriate times, send the control signals to each component of the circuit 200. In some other implementations, the host interface 202 passes in a clock signal from an external processor.

The host interface 202 can send the sets of weight inputs and the initial set of activation inputs to the direct memory access engine 204. The direct memory access engine 204 can store the sets of activation inputs at the unified buffer 208. In some implementations, the direct memory access stores the sets of weights to dynamic memory 210, which can be a memory unit. In some implementations, the dynamic memory is located off of the circuit.

The unified buffer 208 is a memory buffer. It can be used to store the set of activation inputs from the direct memory access engine 204 and outputs of the vector computation unit 214. The direct memory access engine 204 can also read the outputs of the vector computation unit 214 from the unified buffer 208.

The dynamic memory 210 and the unified buffer 208 can send the sets of weight inputs and the sets of activation inputs, respectively, to the matrix computation unit 212. In some implementations, the matrix computation unit 212 is a two-dimensional systolic array. The matrix computation unit 212 can also be a one-dimensional systolic array or other circuitry that can perform mathematical operations, e.g., multiplication and addition. In some implementations, the matrix computation unit 212 is a general purpose matrix processor.

The matrix computation unit 212 can process the weight inputs and the activation inputs and provide a vector of outputs to the vector computation unit 214. In some implementations, the matrix computation unit sends the vector of outputs to the unified buffer 208, which sends the vector of outputs to the vector computation unit 214. The vector computation unit can process the vector of outputs and store a vector of processed outputs to the unified buffer 208. For example, the vector computation unit 214 can apply a non-linear function to outputs of the matrix computation unit, e.g., a vector of accumulated values, to generate activated values. In some implementations, the vector computation unit 214 generates normalized values, pooled values, or both. The vector of processed outputs can be used as activation inputs to the matrix computation unit 212, e.g., for use in a subsequent layer in the neural network. The matrix computation unit 212 will be described in more detail below with reference to FIG. 3 and FIG. 4.

Figure 3:
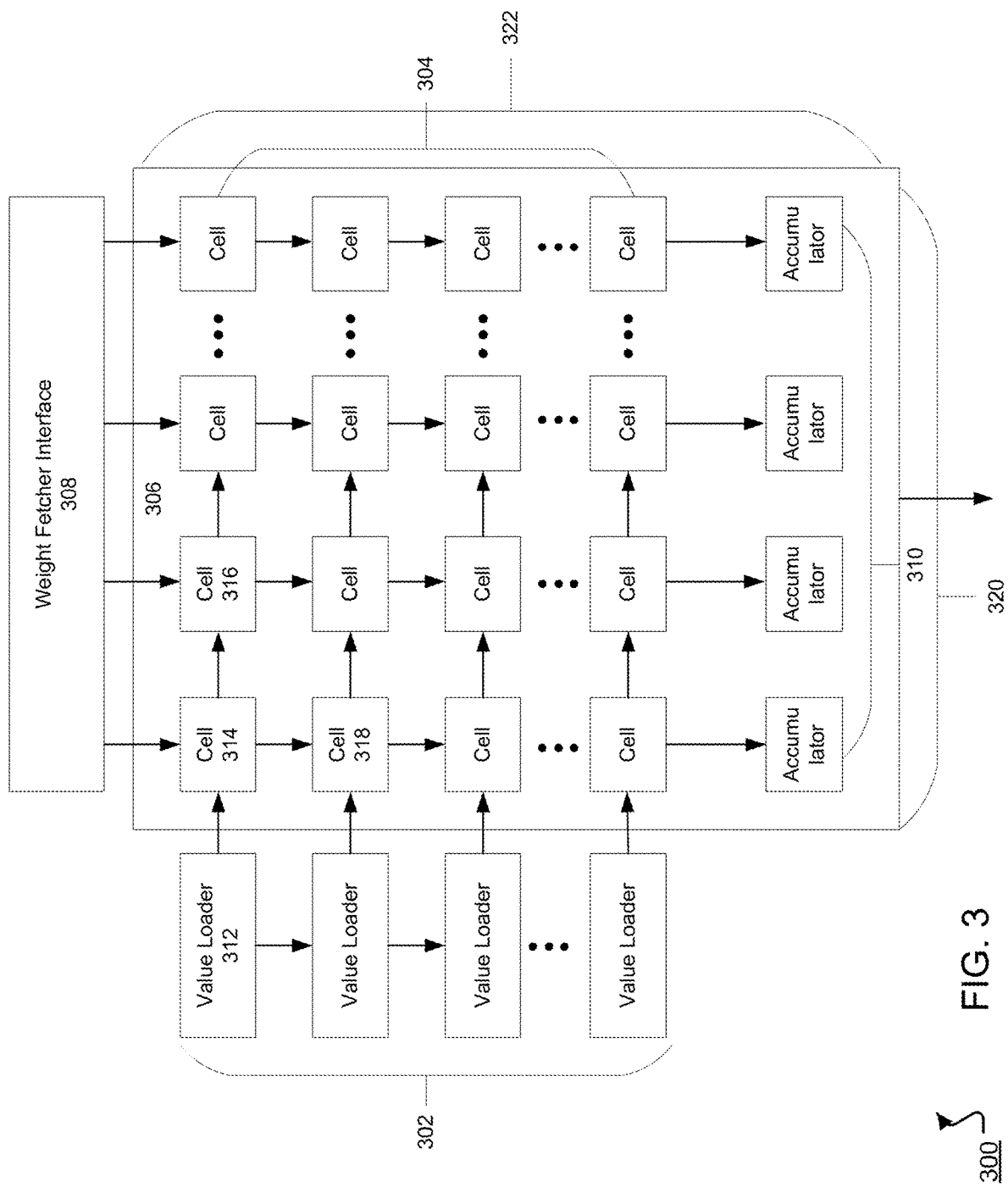
FIG. 3 shows an example architecture including a matrix computation unit.

FIG. 3 shows an example architecture 300 including a matrix computation unit. The matrix computation unit is a two-dimensional systolic array 306. The array 306 includes multiple cells 304. In some implementations, a first dimension 320 of the systolic array 306 corresponds to columns of cells and a second dimension 322 of the systolic array 306 corresponds to rows of cells. The systolic array can have more rows than columns, more columns than rows, or an equal number of columns and rows.

In the illustrated example, value loaders 302 send activation inputs to rows of the array 306 and a weight fetcher interface 308 sends weight inputs to columns of the array 306. In some other implementations, however, activation inputs are transferred to the columns and weight inputs are transferred to the rows of the array 306.

The value loaders 302 can receive the activation inputs from a unified buffer, e.g., the unified buffer 208 of FIG. 2. Each value loader can send a corresponding activation input to a distinct left-most cell of the array 306. The left-most cell can be a cell along a left-most column of the array 306. For example, value loader 312 can send an activation input to cell 314. The value loader can also send the activation input to an adjacent value loader, and the activation input can be used at another left-most cell of the array 306. This allows activation inputs to be shifted for use in another particular cell of the array 306.

The weight fetcher interface 308 can receive the weight input from a memory unit, e.g., the dynamic memory 210 of FIG. 2. The weight fetcher interface 308 can send a corresponding weight input to a distinct top-most cell of the array 306. The top-most cell can be a cell along a top-most row of the array 306. For example, the weight fetcher interface 308 can send weight inputs to cells 314 and 316.

In some implementations, a host interface, e.g., the host interface 202 of FIG. 2, shifts activation inputs throughout the array 306 along one dimension, e.g., to the right, while shifting weight inputs throughout the array 306 along another dimension, e.g., to the bottom. For example, over one clock cycle, the activation input at cell 314 can shift to an activation register in cell 316, which is to the right of cell 314. Similarly, the weight input at cell 316 can shift to a weight register at cell 318, which is below cell 314.

On each clock cycle, each cell can process a given weight input and a given activation input to generate an accumulated output. The accumulated output can also be passed to an adjacent cell along the same dimension as the given weight input. An individual cell is described further below with reference FIG. 4.

The accumulated output can be passed along the same column as the weight input, e.g., towards the bottom of the column in the array 306. In some implementations, at the bottom of each column, the array 306 can include accumulator units 310 that store and accumulate each accumulated output from each column when performing calculations with layers having more weight inputs than columns or layers having more activation inputs than rows. In some implementations, each accumulator unit stores multiple parallel accumulations. This will be described further below with reference to FIG. 6. The accumulator units 310 can accumulate each accumulated output to generate a final accumulated value. The final accumulated value can be transferred to a vector computation unit. In some other implementations, the accumulator units 310 passes the accumulated values to the vector computation unit without performing any accumulations when processing layers with fewer weight inputs than columns or layers having fewer activating inputs than rows.

Figure 4:
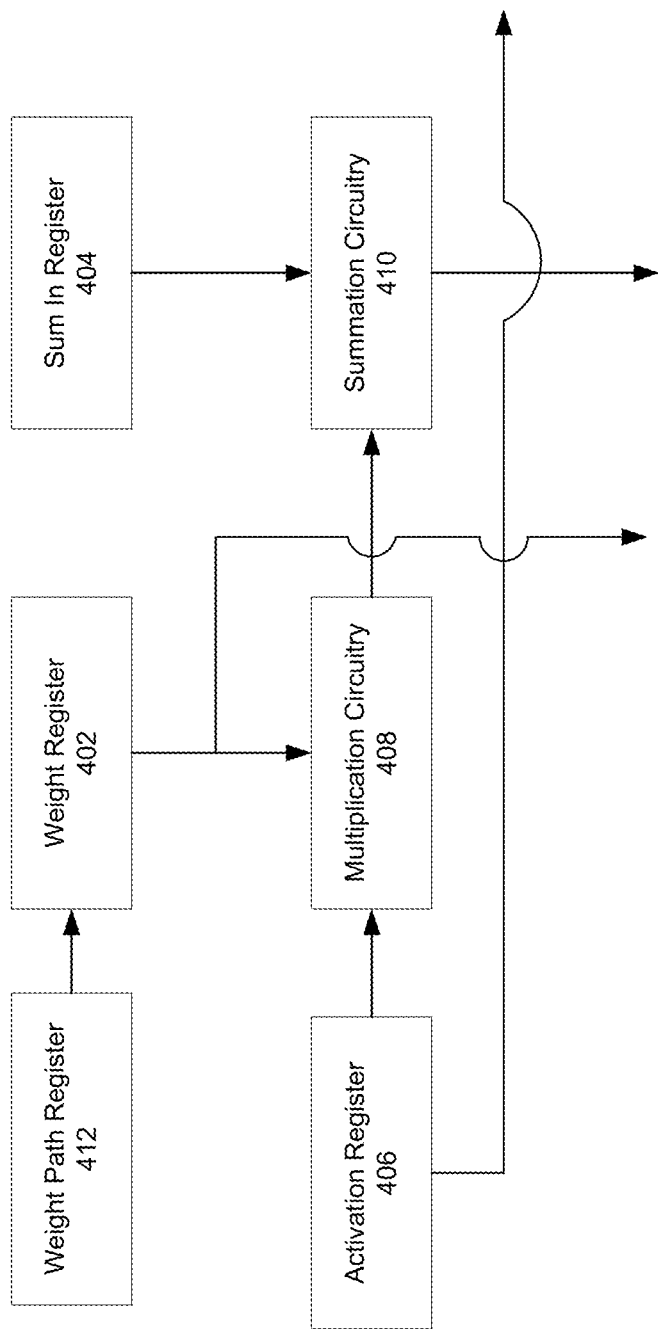
FIG. 4 shows an example architecture of a cell inside a systolic array.

FIG. 4 shows an example architecture 400 of a cell inside a systolic array, e.g., the systolic array 306 of FIG. 3.

The cell can include an activation register 406 that stores an activation input. The activation register can receive the activation input from a left adjacent cell, i.e., an adjacent cell located to the left of the given cell, or from a unified buffer, depending on the position of the cell within the systolic array. The cell can include a weight register 402 that stores a weight input. The weight input can be transferred from a top adjacent cell or from a weight fetcher interface, depending on the position of the cell within the systolic array. The cell can also include a sum in register 404. The sum in register 404 can store an accumulated value from the top adjacent cell. Multiplication circuitry 408 can be used to multiply the weight input from the weight register 402 with the activation input from the activation register 406. The multiplication circuitry 408 can output the product to summation circuitry 410.

The summation circuitry can sum the product and the accumulated value from the sum in register 404 to generate a new accumulated value. The summation circuitry 410 can then send the new accumulated value to another sum in register located in a bottom adjacent cell. The new accumulated value can be used as an operand for a summation in the bottom adjacent cell.

The cell can also shift the weight input and the activation input to adjacent cells for processing. For example, the weight register 402 can send the weight input to another weight register in the bottom adjacent cell. The activation register 406 can send the activation input to another activation register in the right adjacent cell. Both the weight input and the activation input can therefore be reused by other cells in the array at a subsequent clock cycle.

In some implementations, the cell also includes a control register. The control register can store a control signal that determines whether the cell should shift either the weight input or the activation input to adjacent cells. In some implementations, shifting the weight input or the activation input takes one or more clock cycles. The control signal can also determine whether the activation input or weight inputs are transferred to the multiplication circuitry 408, or can determine whether the multiplication circuitry 408 operates on the activation and weight inputs. The control signal can also be passed to one or more adjacent cells, e.g., using a wire.

In some implementations, weights are pre-shifted into a weight path register 412. The weight path register 412 can receive the weight input, e.g., from a top adjacent cell, and transfer the weight input to the weight register 402 based on the control signal. The weight register 402 can statically store the weight input such that as activation inputs are transferred to the cell, e.g., through the activation register 406, over multiple clock cycles, the weight input remains within the cell and is not transferred to an adjacent cell. Therefore, the weight input can be applied to multiple activation inputs, e.g., using the multiplication circuitry 408, and respective accumulated values can be transferred to an adjacent cell.

In some implementations, one neural network input is processed through each of the layers of the neural network to generate a neural network output for the neural network input. in some implementations, however, the circuit processes multiple neural network inputs through the layers of the neural network at once in order to generate neural network outputs for the inputs, thereby increasing the utilization of the circuit.

An input to a particular layer of the neural network can be referred to as a set of activation inputs. Therefore, a neural network input can be a set of activation inputs to a first layer. The first layer can generate an output to be processed by a second layer, and the output can be referred to as a set of activation inputs to the second layer.

In some implementations, instead of the circuit processing one set of activation inputs by sending the activation inputs from a first layer through to a last layer of the neural network to generate an inference, the circuit can process multiple sets of activation inputs at a first layer, e.g., generate accumulated values for each set of activation inputs as described above in FIG. 3, then process multiple sets of activation inputs at a second layer, and so forth. The multiple sets of activation inputs at a given layer can make up one or more batches of inputs. In some implementations, batches for a given layer are processed before the circuit processes batches of a subsequent layer. The circuit can process a batch by generating accumulated values for each input, which can be an independent set of activation inputs, in the batch.

In some implementations, in order to maximize throughput while performing computations for a given neural network layer, the circuit can be caused to process multiple independent activation inputs while the weight inputs for the given neural network layer are loaded in the systolic array. That is, the weight inputs can be reused with multiple activation inputs. In particular, the circuit reuses weight inputs by computing accumulated values using the weight inputs and different activation inputs, e.g., using matrix computation unit 212 of FIG. 2. By way of illustration, the activation inputs can be from multiple different image resources or multiple audio samples. This will be described further below in reference to FIG. 6.

The circuit has a processing speed and a speed at which it can access memory. Generally, the processing speed is faster than the memory access speed. By reusing weights, and thereby utilizing the circuit's processing speed, the circuit can utilize the cells of the systolic array while, in parallel, accessing weight inputs from memory to be used in subsequent computations.

The circuit can determine, for each layer of the neural network, how many times to reuse weights from a weight reuse value for the circuit. This can be determined by software on the circuit that is compiling for the hardware or by hardware. In some implementations, the weight reuse value is a number of times the circuit can reuse weight inputs before a compute time of reusing the weight inputs the number of times with different activation inputs is greater than or equal to a fetch time of accessing new weight inputs from memory. Therefore, the weight reuse value can indicate how many times the circuit should reuse weight inputs to maximize utilization and minimize memory access wait time.

The weight reuse value can be based on one or more of the following: a clock rate of the memory storing the weight inputs, e.g., dynamic memory 210 of FIG. 2, a number of arithmetic units inside the circuit, e.g., inside matrix computation unit 212 of FIG. 2, and a number of channels in memory, e.g., unified buffer 208 and dynamic memory 210 of FIG. 2.

The weight reuse value can be used to determine a respective batch size for each layer of the neural network. The batch size can be referred to as an effective batch size, i.e., a batch size that allows a layer to operate in a way that produces the most efficient amount of weight reuse. The batch size is a number of inputs to be processed at a layer such that the systolic array in the circuit is maximized. In some implementations, a batch size for a given layer is the ceiling of the weight reuse value divided by the number of times that weight inputs are reused at the layer. The number of times that weight inputs are reused can directly correspond to the number of activation inputs stored in cells of a systolic array of the circuit when performing an accumulation calculation. This is because the weight inputs can remain in the cells, i.e., "paused", while new sets of activation inputs are loaded. When new sets of activation inputs are loaded with the weight inputs being frozen in place, the circuit can reuse the weight inputs again to calculate convolutions with the new sets of activation inputs. An example will be described further below in reference to FIG. 6.

Figure 5:
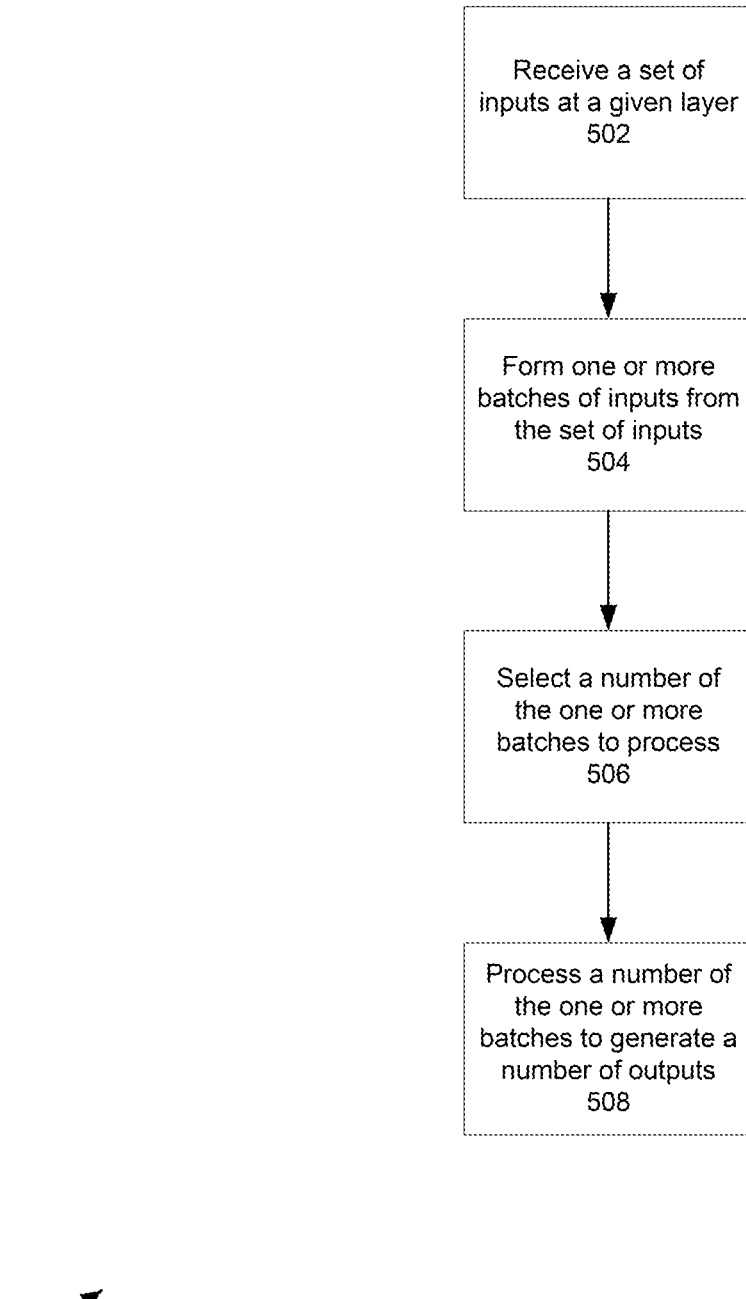
FIG. 5 is a flow diagram of an example method for performing neural network computations for multiple layers.

FIG. 5 is a flow diagram 500 of an example method for performing neural network computations for multiple layers. The method can be performed by a special purpose hardware circuit, e.g., using host 202 of FIG. 2 or by one or more processors, firmware, off-chip processes, or by some other software process that is configured to control the circuit.

The circuit can, during processing at each neural network layer, receive a set of layer inputs for processing by the layer (step 502). The set of layer inputs can be from memory, e.g., unified buffer 208 of FIG. 2, or from a previous layer, i.e., the set of inputs are outputs generated from the previous layer in the network, and using the outputs as the set of inputs can be managed by the host 202 as described above in reference to FIG. 2. Each input can be a set of activation inputs, and can be generated from an independent neural network input.

The system can, for a given neural network layer, form one or more batches of inputs from the set of inputs (step 504). As described above, each neural network layer has an associated batch size. Each formed batch at the layer includes a number of inputs that does not exceed the layer's batch size. The batch size for each neural network layer can be determined as a configuration of the neural network. In some implementations, the batch size for each neural network layer is computed when compiling a neural network model for execution on the circuit. Because the batch size for a given layer can be computed before processing begins at a layer, the number of inputs within a batch can be formed based on the batch size of the given layer.

As an example, if 24 images need to be processed by a neural network, and a first layer of the neural network has a batch size of 8, the circuit can form 3 batches of 8 images, i.e., divide the 24 images into 3 batches of 8 inputs. For each batch, the circuit can process the 8 distinct images in the batch by reusing a particular set of weight inputs for the layer. The circuit can then either (1) process one or more batches at a subsequent layer or (2) process another batch of 8 distinct image resources at the layer using the particular set of weight inputs. The circuit determines whether to proceed with (1) or (2) based on batch sizes of other layers in the neural network, which will be described further below in step 506 and in reference to FIG. 6.

The circuit can, for a given neural network layer, select a number of the one or more batches of inputs to process (step 506). In some implementations, the number is selected such that a count of the inputs in the number of the one or more batches is greater than or equal to the corresponding batch size of a subsequent layer. For example, if a current layer has to process 3 batches each having 5 inputs, and a subsequent layer as a batch size of 10, the circuit can select 2 batches of the 3 to process. The 2 selected batches have a total of 10 inputs, i.e., 2*5, which is equal to the corresponding batch size of the subsequent layer, i.e., 10. In some implementations, the remaining third batch will be processed on a subsequent pass of the systolic array in the circuit. Yet another example will be described further below in reference to FIG. 6.

The circuit can process, e.g., using a systolic array, the selected number of batches of inputs to generate a respective layer output for each input in the selected batches (step 508). The circuit can process each selected batch of inputs by reusing weight inputs when computing accumulated values for each input. As described above, the weight inputs are applied to multiple independent inputs since the weight inputs can remain in the cells, i.e., "paused", while new sets of activation inputs are loaded.

By way of illustration, a batch can have two inputs—a set of activation inputs A1 and a set of activation inputs A2. The circuit can reuse a set of weight inputs W1 by applying the set W1 to both sets A1 and A2 before fetching a set W2 of weight inputs from memory, where the set W2 is a set of weights for a subsequent layer, or, if the layer has more weights to be processed by a systolic array of the circuit, a next subset of weights for the layer. In another example, if there are 8 batches of 5 inputs each to be processed, i.e., a total of 40 inputs, and the circuit selected 4 batches to process, the circuit can process the inputs within the 4 batches, i.e., a total of 20 inputs, to generate respective layer outputs, i.e., a total of 20 layer outputs. This will be described further below in reference to FIG. 6.

After processing the selected number of batches, the circuit can either process a second number of batches at the layer or proceed to process one or more batches of inputs at a subsequent layer. This will be described further below in reference to FIG. 6.

Although this method has been described to be implemented on a circuit processing a neural network, this method can also be implemented on a processor, e.g., a Central Processing Unit (CPU) or a Graphics Processing Unit (GPU). For example, the processor can reuse a weight value some number of times while retrieving weights from memory, e.g., Dynamic Random Access Memory (DRAM).

Figure 6:
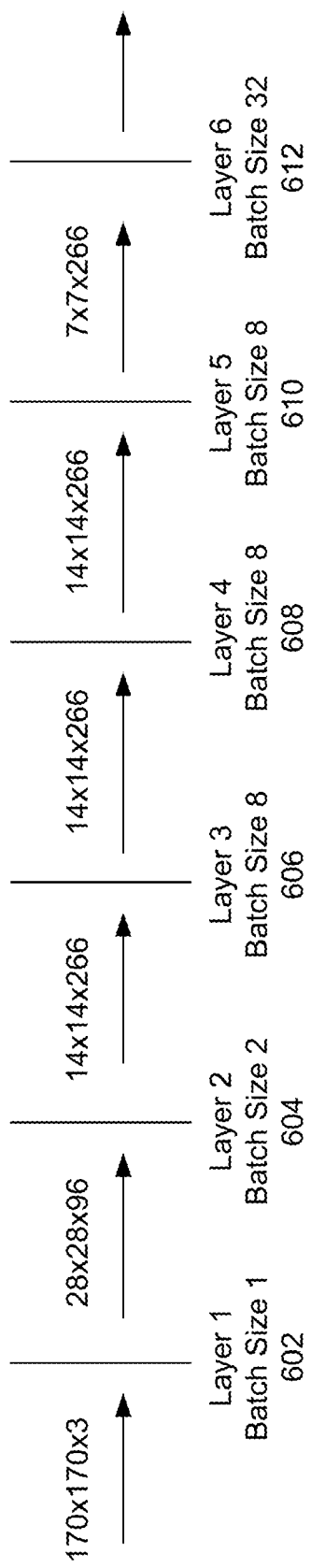
FIG. 6 shows an example neural network having multiple layers and batch sizes for each layer.

FIG. 6 shows an example neural network 600 having multiple layers and a batch size for each layer. As described above, a batch size for a given layer is the ceiling of the weight reuse value divided by the number of times that weight inputs are reused at the layer. The ceiling function can process a number and return the smallest integer that is not less than the number. The number of times that weight inputs are reused can directly correspond to the number of activation inputs stored in cells of a systolic array of the circuit. For example, a weight reuse value for the circuit can be 1500. Layer 1 602 processes a 170×170 input. Each of the 170×170 activation inputs can be stored in a cell of the systolic array. Therefore, the batch size for Layer 1 602 is CEIL (1500/(170*170))=1. The batch size for Layer 2 604 is CELL (1500/(28*28))=2. Using the same calculation, Layers 3-5 606-610 have a batch size of 8 and Layer 6 612 has a batch size of 32. In some implementations, the batch size is rounded to a nearest power of 2.

By way of illustration, Layer 1 has a batch size of 1 input and Layer 2 has a batch size of 2 inputs. The circuit can receive, for example, ten inputs for processing at Layer 1, e.g., 10 total distinct images.

The circuit can determine that two batches out of ten at Layer 1, i.e., for a total of 2 inputs, should be processed. In some implementations, the circuit determines this number by dividing the batch size at Layer 2 with the batch size of Layer 1, i.e., 2/1=2. By processing two batches of single inputs, the circuit processes two inputs, which is equal to a batch size of Layer 2, i.e., 2. The circuit can process the two batches to generate two layer outputs from the two inputs, e.g., by computing two vectors of accumulated values—one from each image. Each layer output can be an input for input to a subsequent layer. The circuit can form a batch of two inputs, e.g., the two vectors of accumulated values, for processing at Layer 2. The batches can be stored in the unified buffer.

The circuit can determine that four batches at Layer 2 should be processed. By processing four batches of size two, the circuit processes eight inputs, which is equal to a batch size of Layer 3, i.e., 8. The circuit can process the four batches to generate eight layer outputs from the eight inputs. Then, the circuit can form a batch of eight inputs for processing at Layer 3.

The circuit can continue until the inputs have been processed at all layers of the neural network. For example, because Layers 3-5 have a batch size of 8, the circuit can determine that one batch of eight inputs at each of the Layers 3-5 should be processed. Similarly, the circuit can determine that four batches having eight inputs each at Layer 5 should be processed, thereby forming a batch of 32 inputs, which can be processed at Layer 6. For each input, Layer 6 can generate one or more layer outputs which can be used for inference.

In some implementations, the circuit calculates, e.g., using arithmetic circuitry, a least common multiple of batch sizes across all layers in the neural network. The circuit can then process a minimum number of inputs equal to or greater than the least common multiple at each layer before processing subsequent layers. In other words, the circuit can determine whether to (1) process a batch at a subsequent layer or (2) process another batch at a current layer based on the least common multiple. For example, the least common multiple of the batch sizes for Layers 1-6 602-612 is 32. After processing one batch at Layer 1, the circuit can determine that Layer 1 generated only 1 output, which is less than the least common multiple of 32. Therefore, the circuit can determine to process another batch at Layer 1, at which point a total of 2 outputs have been generated. The circuit can continue generating outputs until 32 outputs, i.e., the least common multiple, have been generated at Layer 1. Then, the circuit can proceed to process a batch at a subsequent layer. In some implementations, each layer output is stored in a unified buffer, e.g., unified buffer 208 of FIG. 2.

By way of illustration, the circuit can select 32 batches for processing, which totals 32 inputs at Layer 1. The circuit can then select 16 batches totaling 32 inputs at Layer 2, then select 4 batches for processing totaling 32 inputs at Layer 3, then select 4 batches for processing totaling 32 inputs at Layer 4, then select 4 batches for processing totaling 32 inputs at Layer 5, then finally select 1 batch for processing totaling 32 inputs at layer 6.

In some implementations, at a particular layer, the circuit processes a number of inputs greater than the least common multiple based on a system parameter, e.g., a parameter provided by a user. In some implementations, the circuit processes a number of inputs that is divisible by the subsequent layer's batch size. In some other implementations, the circuit receives instructions to process a large number of inputs, and the circuit processes batches of inputs so as to maximize a number of generated outputs at a particular layer before proceeding to generating outputs at a subsequent number. The circuit can constrain the number of outputs that are generated at the particular layer such that the number of outputs generated is divisible by a subsequent layer's batch size.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for performing neural network computations for a neural network having a plurality of neural network layers, the method comprising:
   obtaining a plurality of layer inputs to be processed;
   identifying a weight reuse value representing a number of times that a hardware matrix computation unit of a neural network hardware circuit reuses weight inputs for neural network computations; and
   processing a number of batches comprising layer inputs of the plurality of layer inputs by the hardware matrix computation unit for a first neural network layer, the number of batches corresponding to the weight reuse value.

2. The method of claim 1, wherein the weight reuse value is based at least on a clock rate of a memory storing weight inputs.

3. The method of claim 1, wherein the weight reuse value is based at least on the number of hardware arithmetic units in the hardware matrix computation unit.

4. The method of claim 1, further comprising determining the number of batches based on a batch size of a layer subsequent to the first neural network layer in the plurality of neural network layers.

5. The method of claim 1, further comprising determining a respective batch size for each batch based at least on the weight reuse value divided by the size of the plurality of layer inputs.

6. The method of claim 1, wherein processing the number of batches comprises computing accumulated values for each layer input using the hardware matrix computation unit of the neural network hardware circuit.

7. The method of claim 6, further comprising determining one or more inferences based on one or more layer outputs.

8. The method of claim 1, further comprising determining the batch size, comprising:
   for the plurality of neural network layers, determining a least common multiple of batch sizes across the plurality of neural network layers; and
   determining the batch size including a minimum number of layer inputs that is equal to or greater than the least common multiple.

9. The method of claim 1, wherein each layer input corresponds to a feature of a distinct image resource.

10. The method of claim 1, wherein the plurality of neural network layers are arranged in a directed graph structure.

11. A system for performing neural network computations for a neural network having a plurality of neural network layers, the system comprising:
   one or more processors; and
   a non-transitory computer-readable medium coupled to the one or more processors and having instructions stored thereon, which, when executed by the one or more processors, cause the one or more processors to perform operations comprising:
   obtaining a plurality of layer inputs to be processed;
   identifying a weight reuse value representing a number of times that a hardware matrix computation unit of a neural network hardware circuit reuses weight inputs for neural network computations; and
   processing a number of batches comprising layer inputs of the plurality of layer inputs by the hardware matrix computation unit for a first neural network layer, the number of batches corresponding to the weight reuse value.

12. The system of claim 11, wherein the weight reuse value is based at least on a clock rate of a memory storing weight inputs.

13. The system of claim 11, wherein the weight reuse value is based at least on the number of hardware arithmetic units in the hardware matrix computation unit.

14. The system of claim 11, further comprising determining the number of batches based on a batch size of a layer subsequent to the first neural network layer in the plurality of neural network layers.

15. The system of claim 11, where the respective batch size for each batch is determined based at least on the weight reuse value divided by the size of the plurality of layer inputs.

16. The system of claim 11, wherein processing the number of batches comprises computing accumulated values for each layer input using the hardware matrix computation unit of the neural network hardware circuit.

17. The system of claim 16, further comprising determining one or more inferences based on one or more layer outputs.

18. The system of claim 11, further comprising determining the batch size, comprising:
   for the plurality of neural network layers, determining a least common multiple of batch sizes across the plurality of neural network layers; and
   determining the batch size including a minimum number of layer inputs that is equal to or greater than the least common multiple.

19. A non-transitory computer-readable medium having instructions stored thereon, which, when executed by one or more processors, cause the one or more processors to perform operations comprising:
   obtaining, a plurality of layer inputs for a neural network having a plurality of neural network layers;
   identifying a weight reuse value representing a number of times that a hardware matrix computation unit of a neural network hardware circuit reuses weight inputs for performing neural network computations; and
   processing a number of batches comprising layer inputs of the plurality of layer inputs by the hardware matrix computation unit for a first neural network layer, the number of batches corresponding to the weight reuse value.

20. The computer-readable medium of claim 19, wherein the weight reuse value is based at least on a clock rate of a memory storing weight inputs.

* * * * *